(12) United States Patent
Little

(10) Patent No.: US 9,667,475 B2
(45) Date of Patent: *May 30, 2017

(54) SYSTEMS AND METHODS FOR COMMUNICATING INFORMATION OF PARTICIPANTS REGISTERED WITH A SUB-COORDINATOR DURING DISTRIBUTED TRANSACTION PROCESSING

(71) Applicant: Red Hat, Inc., Raleigh, NC (US)

(72) Inventor: Mark Little, Ebchester (GB)

(73) Assignee: RED HAT, INC., Raleigh, NC (US)

( * ) Notice: Subject to any disclaimer, the term of this patent is extended or adjusted under 35 U.S.C. 154(b) by 28 days.

This patent is subject to a terminal disclaimer.

(21) Appl. No.: 14/193,368

(22) Filed: Feb. 28, 2014

(65) Prior Publication Data

US 2015/0249703 A1     Sep. 3, 2015

(51) Int. Cl.
*G06F 15/16* (2006.01)
*H04L 12/24* (2006.01)
*H04L 29/08* (2006.01)

(52) U.S. Cl.
CPC ...... *H04L 41/0672* (2013.01); *H04L 67/2833* (2013.01)

(58) Field of Classification Search
CPC .............. H04L 29/08072; H04L 29/06; H04L 29/0809; H04L 29/06047; G06Q 30/02

(Continued)

(56) References Cited

U.S. PATENT DOCUMENTS 6,895,529 B2   5/2005   Egolf et al.
7,730,489 B1   6/2010   Duvur et al.

(Continued)

FOREIGN PATENT DOCUMENTS

GB   2335516       9/1999
JP   2007293650   11/2007
JP   2010146134    7/2010

OTHER PUBLICATIONS

Dayal et al., "Resilient Data Staging Through MxN Distributed Transactions", https://cfwebprod.sandia.gov/cfdocs/CCIM/docs/txn.pdf, Sandia National Laboratories, Nov. 2011, pp. 2-31, Albuquerque, NM.

(Continued)

*Primary Examiner* — Mahran Abu Roumi
(74) *Attorney, Agent, or Firm* — Haynes and Boone, LLP

(57) ABSTRACT

Systems and methods are provided for prepare list communication to participants in a two-phase commit protocol transaction processing. An exemplary method includes receiving a distributed transaction for processing, wherein the processing uses a two-phase commit protocol, receiving a distributed transaction comprising a plurality of processes for processing, wherein the processing uses a two-phase commit protocol and preparing, by a main coordinator, at least one participating processing node from the plurality of processes, wherein the at least one participating processing node comprises a first sub-coordinator and a first participant, and wherein the first participant executes a first process of the plurality of processes. The method further includes receiving, by the main coordinator, a first list comprising the first participant registered with the first sub-coordinator. The method may further include contacting, by the main coordinator, the first participant using the first list, in the event of system or first sub-coordinator failure.

16 Claims, 5 Drawing Sheets

(58) Field of Classification Search
USPC .......................................................... 709/201
See application file for complete search history.

(56) References Cited

U.S. PATENT DOCUMENTS

| | | | | |
|---|---|---|---|---|
| 2002/0194242 | A1* | 12/2002 | Chandrasekaran | G06F 9/466 718/101 |
| 2004/0083225 | A1 | 4/2004 | Gondi et al. | |
| 2008/0065702 | A1* | 3/2008 | Dickerson | G06F 17/30306 |
| 2009/0144750 | A1* | 6/2009 | Little | G06F 13/385 719/313 |
| 2009/0300022 | A1* | 12/2009 | Little | G06F 17/30371 |
| 2009/0300074 | A1* | 12/2009 | Little | G06F 17/30377 |
| 2009/0300405 | A1* | 12/2009 | Little | G06F 11/203 714/3 |
| 2011/0055313 | A1* | 3/2011 | Little | G06F 9/466 709/203 |
| 2013/0132458 | A1* | 5/2013 | Little | H04L 67/10 709/201 |
| 2014/0278335 | A1* | 9/2014 | MacAro | G06N 7/005 703/21 |
| 2014/0337303 | A1* | 11/2014 | Little | G06F 17/30371 707/703 |

OTHER PUBLICATIONS

Little, Mark, "Interposed Coordinator Optimisation", Issue 4343, http://www.omg.org/issues/issue4343.txt, Jun. 13, 2001, 7 pages, Issue 4343, Red Hat.

* cited by examiner

SYSTEMS AND METHODS FOR COMMUNICATING INFORMATION OF PARTICIPANTS REGISTERED WITH A SUB-COORDINATOR DURING DISTRIBUTED TRANSACTION PROCESSING

FIELD OF DISCLOSURE

The present disclosure generally relates to a two-phase commit protocol transaction processing, and more particularly to communicating participant information for participants executing on a processing node to a main coordinator in a two-phase commit protocol when the participants are registered with a sub-coordinator on the processing node.

BACKGROUND

A distributed transaction may include a set of processes or operations that may involve the use of more than one network host/resource. For example, a distributed transaction may call for database updates or operations using more than one database. A network host may provide for transaction resources utilized by a process, such as the database that requires updating and/or use. A transaction manager may receive a distributed transaction and prepare participating processes to execute on required network hosts. Thus, the transaction manager may prepare a coordinator network host/node that manages a set of participating network nodes each executing one or more processes of the distributed transaction. When the participating network nodes are established, the participating network node may establish sub-coordinators that register with the upstream coordinator on the transaction manager. Participants executing the processes received by the participating network node may then register with the sub-coordinator instead of the coordinator on the transaction manager. Thus, the transaction manager may view the sub-coordinator as a participant, while each participant views the sub-coordinator as the main coordinator.

Similar to other transactions, distributed transaction must maintain atomicity, consistency, isolation, and durability properties (ACID properties). Atomicity requires that changes made during processing a transaction are atomic, either all the changes to a database during an operation or update occur or they all do not occur. This prevents database updates from partially occurring, which would affect the reliability and consistency of the databases. Thus, in the event of a system failure, if a sub-coordinator does not recover as quickly as a corresponding participant, the participant must wait until the sub-coordinator recovers to commit or rollback the process.

BRIEF SUMMARY

This disclosure relates to distributed transaction processing systems and two-phase commit protocol transaction processing. Methods, systems, and techniques for communicating information of participants registered with a sub-coordinator during distributed transaction processing are provided According to an embodiment, a method for distributed transaction processing includes receiving a distributed transaction comprising a plurality of processes for processing, wherein the processing uses a two-phase commit protocol, and preparing, by a main coordinator, at least one participating processing node from the plurality of processes, wherein the at least one participating processing node comprises a first sub-coordinator and a first participant, and wherein the first participant executes a first process of the plurality of processes. The method further includes receiving, by one or more hardware processors of the main coordinator, a first list comprising the first participant registered with the first sub-coordinator.

According to another embodiment, a system for distributed transaction processing includes a main coordinator node that receiving a distributed transaction comprising a plurality of processes for processing, wherein the processing uses the two-phase commit protocol and at least one participating processing node coupled to the coordinator node, wherein the at least one participating processing node comprises a first sub-coordinator and a first participant, and wherein the first participant executes a first process of the plurality of processes, and wherein the at least one participating processing node transmits a first list comprising the first participant registered with the first sub-coordinator to the main coordinator node.

According to another embodiment, a non-transitory computer readable medium comprising a plurality of machine-readable instructions which when executed by one or more processors of a server are adapted to cause the server to perform a method including receiving a distributed transaction comprising a plurality of processes for processing, wherein the processing uses a two-phase commit protocol and preparing, by a main coordinator, at least one participating processing node from the plurality of processes, wherein the at least one participating processing node comprises a first sub-coordinator and a first participant, and wherein the first participant executes a first process of the plurality of processes. The method further includes receiving, by the main coordinator, a first list comprising the first participant registered with the first sub-coordinator.

BRIEF DESCRIPTION OF THE DRAWINGS

The accompanying drawings, which form a part of the specification, illustrate embodiments of the invention and together with the description, further serve to explain the principles of the embodiments. It should be appreciated that like reference numerals may be used to identify like elements or similarly functioning elements illustrated in one or more of the figures. The drawing in which an element first appears is generally indicated by the left-most digit in the corresponding reference number.

DETAILED DESCRIPTION

It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

Figure 1:
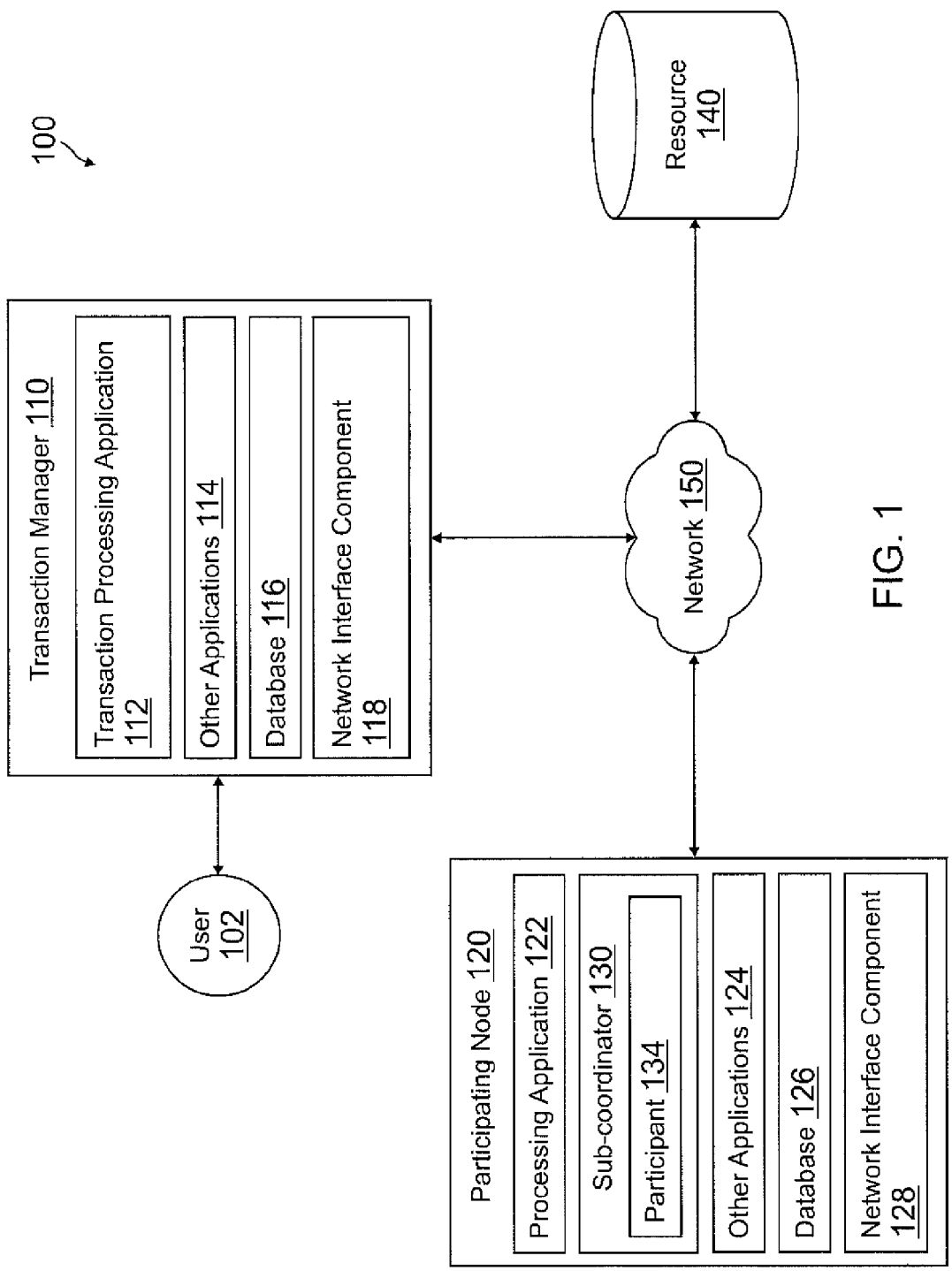
FIG. 1 is a simplified block diagram an exemplary system for communicating information of participants registered with a sub-coordinator during distributed transaction processing, according to an embodiment.

FIG. 1 is a simplified block diagram an exemplary system for communicating information of participants registered with a sub-coordinator during distributed transaction processing, according to an embodiment. Terms like "machine," "device," "computer," and "computing system" are used interchangeably and synonymously throughout this document. System 100 may include a server computing system or a client computing system.

FIG. 1 is a block diagram of a networked system 100 suitable for implementing the processes described herein according to an embodiment. As shown, system 100 may comprise or implement a plurality of devices, servers, and/or software components that operate to perform various methodologies in accordance with the described embodiments. Exemplary device and servers may include device, stand-alone, and enterprise-class servers, operating an OS such as a MICROSOFT® OS, an APPLE® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a client 102, a transaction manager 110, a participating node 120, and a resource 140 in communication over a network 150. Client 102, transaction manager 110, participating node 120, and resource 140 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

In FIG. 1, client 102 may submit a distributed transaction for processing to transaction manager 110, such as a transaction having processes requiring the use of resource 140. Transaction manager 110 may establish participating node 130 to execute the processes of the distributed transaction. Although only one participating node 130 is shown, a plurality of participating nodes may be established by transaction manager 110. Participating node 130 may utilize resource 140 to complete the processes. Additionally, when establishing one or more participants to complete the processes, participating node 130 may create sub-coordinators local to participating node 120 that registers the participants executing on participating node 130. Client 102 may be implemented using any appropriate hardware and software configured for wired and/or wireless communication with transaction manager 110. For example, in one embodiment, client 102 may be implemented as a personal computer (PC), a smart phone, personal digital assistant (PDA), laptop computer, tablet computer and/or other types of computing devices capable of transmitting and/or receiving data. Although a client is shown, the client may be managed or controlled by any suitable processing device. Although only one client is shown, a plurality of clients may be utilized.

Transaction manager 110 may be implemented using any appropriate hardware and software configured for wired and/or wireless communication with participating node 120 and resource 140 over network 150. For example, in one embodiment, transaction manager 110 may be implemented as a personal computer (PC), a smart phone, personal digital assistant (PDA), laptop computer, tablet computer and/or other types of computing devices capable of transmitting and/or receiving data. Although a transaction manager is shown, the transaction manager may be managed or controlled by any suitable processing device.

Transaction manager 110 may utilize one or more applications to process a distributed transaction, where the applications may utilize a two-phase commit protocol (2PC) to process the distributed transaction. In this regard, transaction manager 110 contains a transaction processing application 112, other applications 114, a database 116, and a network interface component 118. Transaction processing application 112 and other applications 114 may correspond to processes, procedures, and/or applications executable by a hardware processor, for example, a software program. In other embodiments, transaction manager 110 may include additional or different software as required.

Transaction processing application 112 may be implemented as an application configured to provide distributed transaction processing to client 102. Client 102 may transmit a distributed transaction to transaction manager 110 for processing. Transaction processing application 112 may receive and process the distributed transaction by determining the processes of the distributed transaction and establishing participating network nodes to execute the processes of the distributed transaction. In this regard, transaction processing application 112 may establish participating node 120, which may perform a process on resource 140. A process may correspond to a database update/use that changes (e.g., adds, alters, or deletes) data stored on the database. As database transactions often require the use of multiple databases, multiple participating nodes 120 may be established, each operating on one or more resource 140.

Transaction processing application 112 may utilize a two-phase commit protocol (2PC) to determine whether each of the established transaction participants (e.g., participating node 120) is ready to execute and commit the respective process on operated-on resource of the transaction participant. 2PC requires a main transaction coordinator to poll the participating nodes to determine whether the processes can commit, or are in a state where the processes have executed correctly and may make the changes to the database (called a voting phase). If every participating node responds that their respective process can commit, then the main coordinator instructs the nodes to commit the process (called a commit phase). If any participating node responds that the node cannot commit, then the distributed transaction is rolled back so that no changes take place.

Transaction processing application 112 may establish a coordinator that may determine whether each of the transaction participants is ready to commit the process using the resource (e.g., commit the data transformation on the database updated by the process). The transaction participants may execute the process up to the point that the process is ready to commit. Once the transaction participant is ready to commit, the coordinator may poll the transaction participant and the transaction participant may communicate the status (e.g., a ready to commit status) to the coordinator established by transaction processing application 112. If any of the participants fail to prepare the process to a ready to commit point, the coordinator of transaction processing application 112 may inform all of the established transaction participants to roll back and prevent any process from executing and committing the changes to the resource. Transaction processing application 112 may retain a transaction log having the transaction participants, an initial state of each of the transaction participants (e.g., a rollback state), and/or processes taken by each of the transaction participants. The transaction log may be utilized for rollback to an initial state in the event of system failure, failure of a participant, and/or failure of the coordinator.

After establishing participating node 120 to execute at least one process of a distributed transaction, participating node 120 may establish one or more sub-coordinators that register with the coordinator established by transaction processing application 112 as the participant, as will be explained in more detail with reference to participating node 120. In turn, the participants created by participating node 120 to execute process(es) of the distributed transaction register with the sub-coordinator on participating node 120 instead of directly with the coordinator established on transaction manager 110 by transaction processing application 120. During the voting phase when prepare calls are made to participating node 120 to prepare the process(es) up to a ready to commit phase, transaction manager 110 receives a list of all participants registered by with the sub-coordinator on participating node 120. Additionally, the list may further include additional sub-coordinators registered with the sub-coordinator communicating with transaction manager 110 and the participants registered with the additional sub-coordinators. Thus, transaction processing application 112 may receive and process a hierarchy of all sub-coordinators on participating node 120 and participants executing the process(es) of the distributed transaction registered with those sub-coordinators.

During processing of the distributed transaction, transaction manager 110 or the coordinator of transaction manager 110 may fail, participating node 120 or a sub-coordinator on participating node 120 may fail, or both may fail (e.g., system failure). During recovery, transaction manager 110 and the coordinator established by transaction processing application 112 may recover prior to a sub-coordinator having registered transaction participants recovers. Thus, transaction processing application 112 may inquire to the state of the transaction participants and commit or rollback the transaction participants using the list of participants registered with the sub-coordinator waiting to recover. Transaction manager 110 may retain information of the commit or rollback decision and outcome by the transaction participant for use when all sub-coordinators recover. Additionally, the transaction participant on participating node 120 may retain and transmit data on the completed and committed processes or a rollback decision (e.g., a heuristic-like status of the transaction participant deciding to commit or rollback) to the sub-coordinator when the sub-coordinator recovers, as will be explained in more detail herein.

Transaction manager 110 includes other applications 114 as may be desired in particular embodiments to provide features to transaction manager 110. For example, other applications 114 may include security applications for implementing security features, programmatic client applications for interfacing with appropriate application programming interfaces (APIs) over network 150, or other types of applications. Other applications 114 may contain software programs, executable by a processor, including a graphical user interface (GUI) configured to provide an interface to a client/user/system administrator.

Transaction manager 110 may further include database 116 which may include, for example, 2PC protocol information, network node information including identifiers, corresponding resources, and/or processing information. Database 116 may include a distributed transaction for processing by transaction manager 110. Information in database 116 may correspond to sub-coordinators registered with a coordinator on transaction manager 110. Additionally, database 116 may include transaction participants and/or additional sub-coordinators registered with the sub-coordinators (including further transaction participants/sub-coordinators registered with the additional sub-coordinators). Thus, database 116 may include a hierarchy of all sub-coordinators and transaction participants used in processing a distributed transaction. Database 116 may include information on established transaction participants including a commit state of the corresponding established transaction participant and/or an outcome of the transaction participants (e.g., commit or rollback).

In various embodiments, transaction manager 110 includes at least one network interface component 118 adapted to communicate with transaction participant and resource 140 over network 150. In various embodiments, network interface component 118 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Participating node 120 may be implemented using any appropriate hardware and software configured for wired and/or wireless communication with transaction manager 110 and resource 140 over network 150. For example, in one embodiment, participating node 120 may be implemented as a personal computer (PC), a smart phone, personal digital assistant (PDA), laptop computer, tablet computer and/or other types of computing devices capable of transmitting and/or receiving data. Although a participating node is shown, the participating node may be managed or controlled by any suitable processing device. Although only one participating node is shown, a plurality of participating nodes may be utilized.

Participating node 120 may utilize one or more applications to process a received prepare request having at least one process of a distributed transaction using a two-phase commit protocol application (2PC). In this regard, participating node 120 contains a processing application 122, a sub-coordinator 130, a participant 134, other applications 124, a database 126, and a network interface component 128. Processing application 122 and other applications 124 may correspond to processes, procedures, and/or applications executable by a hardware processor, for example, a software program. In other embodiments, participating node 120 may include additional or different software as required.

Processing application 122 may be configured to provide processing of received prepare requests from a main coordinator established by transaction manager 110. In this regard, processing application 122 may receive a prepare request from transaction manager 110. The prepare request may include a process to execute by participating node 120. Using a 2PC protocol, processing application 122 establishes sub-coordinator 130 to register with the main coordinator on transaction manager 110. Sub-coordinator 130 may register as a participant to the main coordinator on transaction 110 so that the main coordinator views sub-coordinator 130 as a participant executing processes of a distributed transaction. Thus, the main coordinator may poll sub-coordinator 130 during the voting phase to determine whether to commit or rollback processes of the distributed transaction. Therefore, processing application 122 further establishes participant 134 to execute process(es) of a distributed transaction received from the coordinator on transaction manager 110. Participant 134 registers with sub-coordinator 130 instead of the main coordinator on transaction manager 110. Processing application 122 may transmit information of participant 134 registered with sub-coordinator 130 to transaction manager 110. Thus, processing application 122 may respond to a prepare call to prepare a processes for commitment from transaction manager 110 with information identifying participant 134 registered with sub-coordinator 130 so that transaction manager 110 is aware of participant 134. Both sub-coordinator 130 and participant 134 may correspond to one or a plurality of sub-coordinators and participants, respectively.

Participant 134 executes the process up until participant 134 is ready to commit the changes to one or more resources (e.g., resource 140). Once participant 134 reaches this state, a "ready to commit" state, participant 134 may respond to a query by transaction manager 110 with information that participant 134 is ready to commit the process to the resource. Participant 134 may receive the query from sub-coordinator 134 if sub-coordinator has not failed. However, in the event that sub-coordinator 134 fails and recovers later than the main coordinator on transaction manager 110, transaction manager 110 may utilize the information of participant 134 registered with sub-coordinator 130 to contact participant 134 and determine whether to commit or rollback participant 134 and other participants.

While executing the process up to a ready to commit state, participant 134 may retain a transaction log having data corresponding to the main coordinator on transaction manager 110, an initial state of resource 140, and processes taken by participant 134. Participant 134 may wait until the main coordinator on transaction manager 110 or sub-coordinator 130 notifies the transaction participant to commit before executing the process on the resource (e.g., permanently changing the resource to survive failures and meet the durability requirement of transaction processing). If the participant 134 fails, the main coordinator fails, coordinator 134 fails, and/or another participant fails or cannot be reached, or another issue arises, the transaction log can be used to "rollback" or revert to the initial state of resource 140 prior to execution of the process(es) by participant 134.

Participant 134 may further receive a commit or rollback instruction from transaction manager 110 and/or sub-coordinator 130. In the event of no system, node, coordinator, and/or sub-coordinator failure, the commit or rollback instruction may be transmitted from transaction manager 110 to sub-coordinator 130 and then to participant 134. However, in the event of a failure, if sub-coordinator 130 recovers after the main coordinator on transaction manager 110, participant 134 may receive the commit or rollback instruction directly from transaction manager 110 using the information of participant 134 registered with sub-coordinator 130 that was received by transaction manager 110 during the prepare calls. Thus, transaction manager 110 may inform participant 134 to commit or rollback without the use of sub-coordinator 130.

If participant 134 commits the process to resource 140 while sub-coordinator 130 has not yet recovered (e.g., on instruction from transaction manager 110), participant 134 may record the outcome (e.g., the executed processes). Thus, information corresponding to the executed process (e.g., the steps, outcome, etc.) may be recorded to database 126 or other source by participant 134. The information may be durably recorded to prevent loss. The information may correspond to a heuristic-like status code having the completion status of participant 134. When sub-coordinator 134 eventually recovers, sub-coordinator 134 may utilize the stored information to determine an outcome of participant 134. Thus, sub-coordinator 134 is aware that participant 134 committed or rolled-back the processes and did not end autonomously.

In various embodiments, participating node 120 includes other applications 124 as may be desired in particular embodiments to provide features for participating node 120. For example, other applications 124 may include security applications for implementing security features, programmatic server applications for interfacing with appropriate application programming interfaces (APIs) over network 150, or other types of applications. Other applications 124 may contain software programs, such as a graphical user interface (GUI), executable by a processor that is configured to provide an interface to the user.

Participating node 120 includes database 126, which may be configured to store 2PC protocol information, network node information including identifiers, corresponding resources, and/or processing information. Database 126 may include a distributed transaction processes designated for processing by participating node 120. Database 126 may include information of sub-coordinator 130 and participant 134, including registration information of participant 134 with sub-coordinator 130 and registered information of sub-coordinator 130 with the main coordinator on transaction manager 110. Database 126 may include transaction log information for coordinator, initial state of a resource used by participating node 120, completed processes by participating node 120 or other information necessary for rollback and roll-forward states.

In various embodiments, participating node 120 includes at least one network interface component 128 adapted to communicate with network 150 including transaction manager 110 and/or resource 140. In various embodiments, network interface component 128 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Resource 140 may correspond to a resource accessible and utilized by transaction manager 110 and/or participating node 120 during processing of a distributed transaction. Resource 140 may correspond to a database having data organized and/or stored in data structures that may be searched, altered, and stored. It is understood that resource 140 is exemplary and various embodiments may include a different number of resources as desired. Although resource 140 is shown separate and accessible over network 150 to participating node 120, in various embodiments, resource 140 may be local or contained within participating node 120.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, for example the various components of system 100 of FIG. 1.

Figure 2:
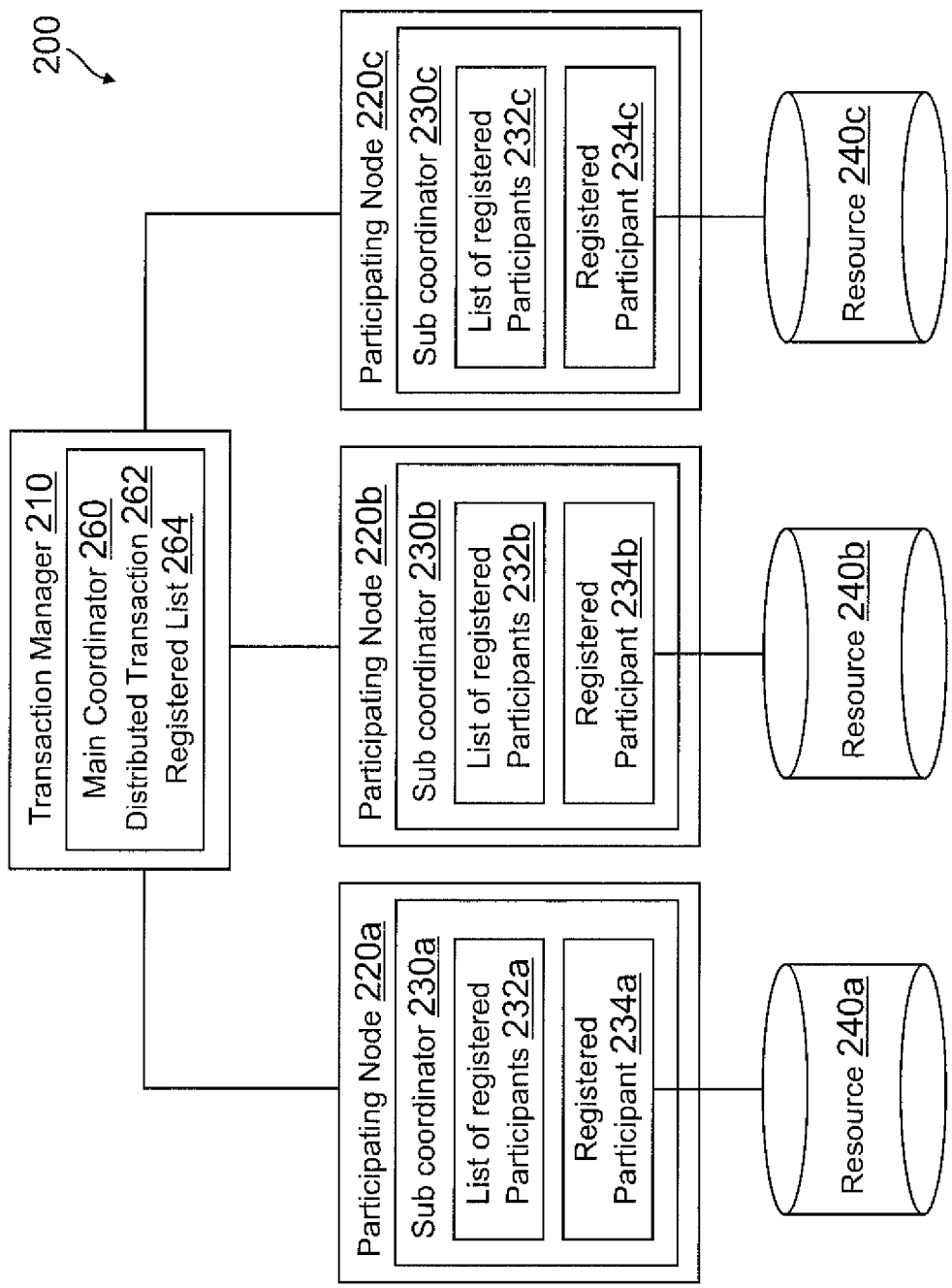
FIG. 2 is an exemplary environment illustrating a main coordinator including a registered participant list for participating nodes having sub-coordinators with registered participants, according to an embodiment.

FIG. 2 is an exemplary environment illustrating a main coordinator including a registered participant list for participating nodes having sub-coordinators with registered participants, according to an embodiment. FIG. 2 includes a transaction manager 210 corresponding generally to transaction manager 210 of FIG. 1 and participating nodes 220a, 220b, and 220c corresponding generally to participating node 120 of FIG. 1. Additionally, resource(s) 240a, 240b, and 240c of FIG. 2 correspond generally to resource 140 of FIG. 1.

System environment 200 correspond generally to a distributed transaction processing system that uses a two-phase commit protocol (2PC) to process the distributed transaction. Thus, as previously discussed, transaction manager 210 receives a distributed transaction 262 having a plurality of processes that require the use of resource(s) 240a, 240b, and 240c. For example, distributed transaction 262 may require updates to databases corresponding to resource(s) 230a, 230b, and 230c, such as a financial transaction for an item or service (e.g., a sale of a plane ticket, a wire transfer with a resulting good shipped, etc.). In order to process distributed transaction 262, transaction manager 210 may establish a main coordinator 260.

Main coordinator 260 establishes participating nodes 220a, 220b, and 220c that individually each execute processes of distributed transaction 262. Participating nodes 220a, 220b, and 220c also each have a corresponding sub-coordinator 230a, 230b, and 230c. Sub-coordinators 230a, 230h, and 230c may correspond to coordinators used by participating nodes 220a, 220b, and 220c, respectively, for processing the process(es) of distributed transaction 262 received by participating node 220a, 220b, and 220c. Sub-coordinators 230a, 230b, and 230c each register with main coordinator 260 so that main coordinator 260 views each of sub-coordinator 230a, 230b, and 230c as the participants processing distributed transaction 262. However, participating node 220a, 220b, and 220c establish registered participant 234a, 234b, and 234c, respectively, to execute the process(es) of distributed transaction 262 received by participating node 220a, 220b, and 220c. Registered participants 234a, 234b, and 234c may each correspond to one or a plurality of participants executing processes of distributed transaction 262. Registered participants 234a, 234b, and 234c register with sub-coordinator 230a, 230b, and 230c, respectively, instead of with main coordinator 260. Thus, registered participants 234a, 234b, and 234c are not registered with main coordinator 260 when established by participating node 220a, 220b, and 220c.

Sub-coordinators 230a, 230b, and 230c include lists of registered participants 232a, 232b, and 232c, respectively. List of registered participants 232a includes information of registered participants 234a that is registered with sub-coordinator 230a. Similarly, list of registered participants 232b includes information of registered participants 234b that is registered with sub-coordinator 230b and list of registered participants 232c includes information of registered participants 234c that is registered with sub-coordinator 230c. During the establishment of sub-coordinator 230a, 230b, and 230c and registered participants 234a, 234b, and 234c (i.e., the prepare phase/call started by transaction manager 210), participating node 220a, 220b, and 220c communicate lists of registered participants 232a, 232b, and 232c to transaction manager 210. Thus, transaction manager 210 includes registered list 264 having registered participants 234a, 234b, and 234c that are registered with sub-coordinator 230a, 230b, and 230c, respectively, where sub-coordinator 230a, 230b, and 230c are in communication with main coordinator 260. Information in registered list 264 enabled main coordinator to communicate with registered participants 234a, 234b, and 234c.

Registered participants 234a, 234b, and 234c may each execute their respective process(es) up to a point where registered participants 234a, 234b, and 234c are ready to commit the processes to resource 240a, 240b, and 240c, respectively. In the event of no failure, main coordinator may inform participating nodes 220a, 220b, and 220c that registered participants 234a, 234b, and 234c may commit or rollback their respective processes from distributed transaction 250 through sub-coordinator 230a, 230b, and 230c, respectively. Main coordinator 260 may commit the processes of registered participants 234a, 234b, and 234c if, during the voting phase, each of registered participants 234a, 234b, and 234c are ready to commit their processes. Conversely, if registered participants 234a, 234b, and/or 234c are not ready to commit, have failed, or cannot commit their process(es), main coordinator 260 may rollback the process(es) of registered participants 234a, 234b, and 234c.

Figure 3:
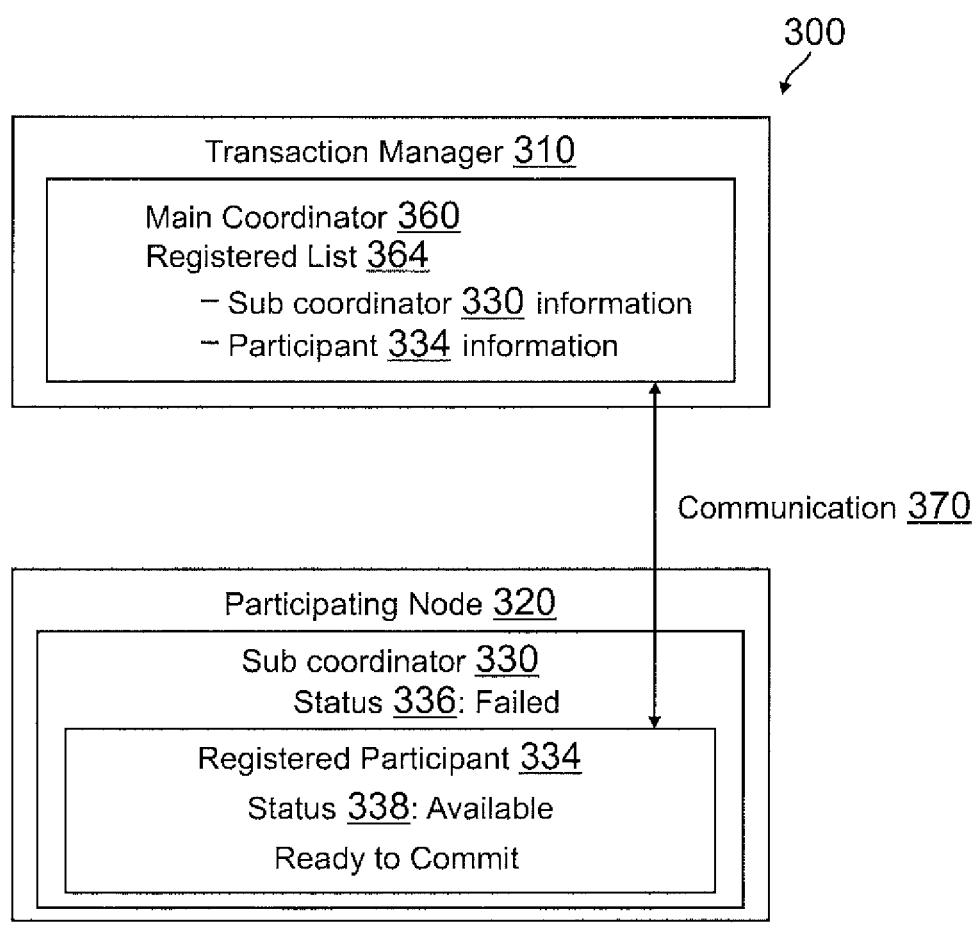
FIG. 3 is an exemplary environment showing a main coordinator of a transaction manager contacting a registered participant directly after failure, according to an embodiment.

In the event of failure (e.g., a system failure or a failure of main coordinator 260 and/or sub-coordinators 230a, 230b, and/or 230c), if one or more of sub-coordinators 230a, 230b, and 230c fail to recover, or recover later than main coordinator 260, main coordinator 260 may utilize registered list 264 to contact registered participant 234a, 234b, and/or 234c to instruct registered participant 234a, 234b, and/or 234c to commit or rollback their process. If registered participants 234a, 234b, and/or 234c are instructed to commit or rollback by main coordinator 260 using registered list 264, registered participant 234a, 234b, and/or 234c or participating node 220a, 220b, and 220c may durably record the outcome and actions of registered participant 234a, 234b, and/or 234c for sub-coordinator 230a, 230b, and/or 230c to process when sub-coordinator 230a, 230b, and/or 230c recovers. FIG. 3 displays an environment including an unrecovered sub-coordinator.

FIG. 3 is an exemplary environment showing a main coordinator of a transaction manager contacting a registered participant directly after failure, according to an embodiment. FIG. 3 includes a transaction manager 310, a participating node 320, sub-coordinator 330, and registered participant 334 corresponding generally to transaction manager 110, participating node 120, sub-coordinator 130, and registered participant 134, respectively, of FIG. 1. Additionally, FIG. 3 includes a main coordinator 360 having a registered list 364 corresponding generally to main coordinator 260 having registered list 264 of FIG. 2.

As shown in FIG. 3, sub-coordinator 330 on participating node 320 has status 336 indicating a failure of sub-coordinator 330. Thus, main coordinator 360 on transaction manager 310 cannot contact sub-coordinator 330 to determine a status and instruct registered participant 334 to commit or roll back. Sub-coordinator has not recovered in FIG. 3, thus, main coordinator 360 cannot complete commit or rollback instructions to finish a distributed transaction. Resources locked by registered participant 334 are therefore locked until sub-coordinator 330 recovers or main coordinator 360 instructs registered participant 334 to commit or rollback directly.

Thus, in FIG. 3, main coordinator 360 uses registered list 364 to commit or rollback registered participant 334. Registered list 364 has sub-coordinator 330 information and participant 334 information received during a prepare phase of participating node 320. As previously discussed, participating node 320 responds to transaction manager 310 a list of sub-coordinators and registered participants with those sub-coordinators. Using registered list 364, main coordinator 360 may communicate with registered participant 334 through communication 370. As shown in FIG. 3, registered participant 334 has status 338 showing registered participant 334 is available (e.g., either not failed or recovered) and ready to commit. Thus, if all other registered participants executing processes of a distributed transaction are ready to commit, main coordinator 360 can issue a commit command to registered participant 334 and commit the process. If registered participant 334 commits or rolls-back the transaction processes, registered participant 334 may record information corresponding to the transaction processes for when sub-coordinator 330 recovers.

Figure 4:
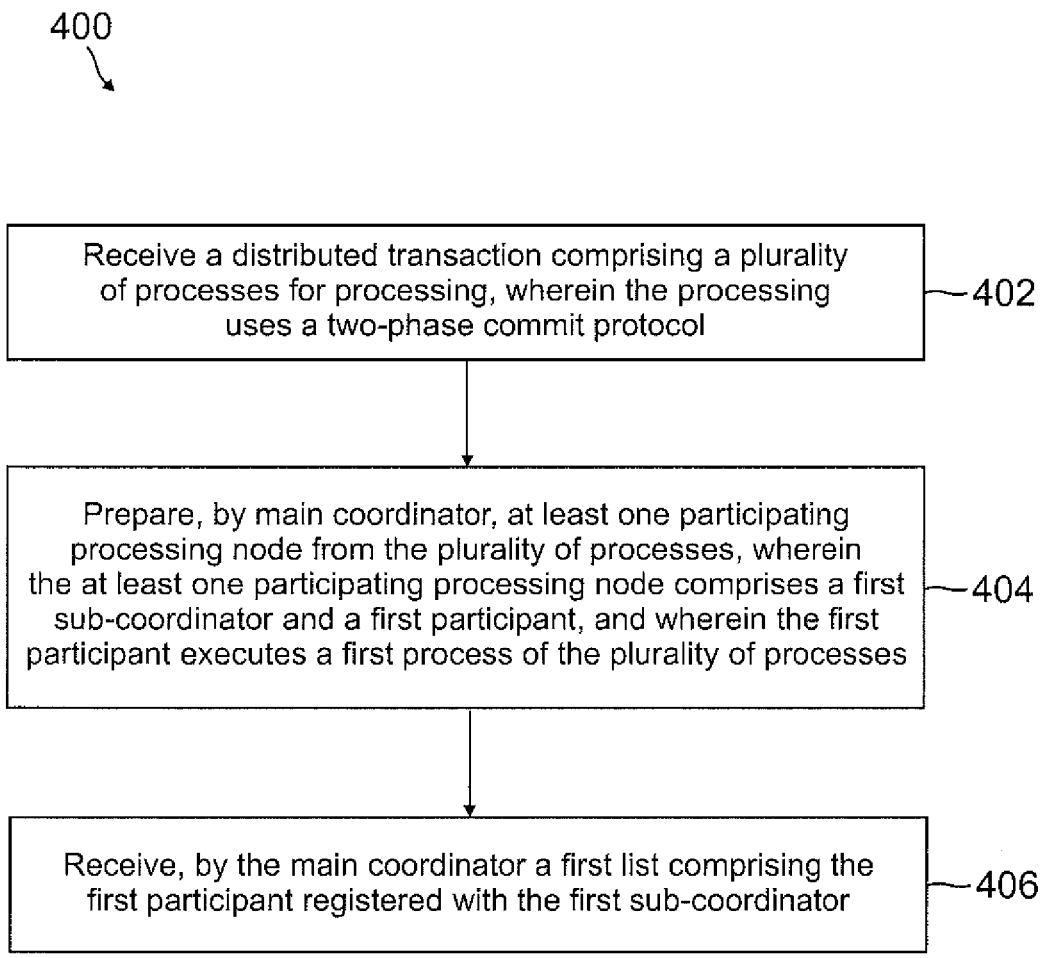
FIG. 4 is an exemplary flowchart illustrating a method for communicating information of participants registered with a sub-coordinator during distributed transaction processing, according to an embodiment.

FIG. 4 is an exemplary flowchart illustrating a method for communicating information of participants registered with a sub-coordinator during distributed transaction processing, according to an embodiment. Note that one or more steps, processes, and methods described herein may be omitted, performed in a different sequence, or combined as desired or appropriate.

At step 402, a distributed transaction comprising a plurality of processes for processing is received, wherein the processing uses a two-phase commit protocol. At step 404, a main coordinator prepares at least one participating processing node from the plurality of processes, wherein the at least one participating processing node comprises a first sub-coordinator and a first participant, and wherein the first participant executes a first process of the plurality of processes.

A first list comprising the first participant registered with the first sub-coordinator is received, at step 406. In certain embodiments, the at least one participating processing node further comprises a second sub-coordinator and a second participant registered with the second sub-coordinator, wherein the second participant executes a second process of the plurality of processes, and wherein the first list further comprises the second sub-coordinator registered with the first sub-coordinator. Thus, the second sub-coordinator may transmit a second list comprising the second participant registered with the second sub-coordinator to the first sub-coordinator, and wherein the first list further comprises the second list.

Receiving the first list may comprise determining the first list using received information, such as participants and sub-coordinators. Additionally, determining the first list may use the second list received from a second sub-coordinator. In certain embodiments, the main coordinator may contact the first participant using the first list. The main coordinator may contact the first participant in an event of a system failure or a failure of the first sub-coordinator. Contacting the first participant may comprise determining a commit state of the first participant. In other embodiments, contacting the first participant may comprise committing or rolling-back the first process executed by the first participant, and wherein the first participant records information of the committing or rolling-back the first process.

Figure 5:
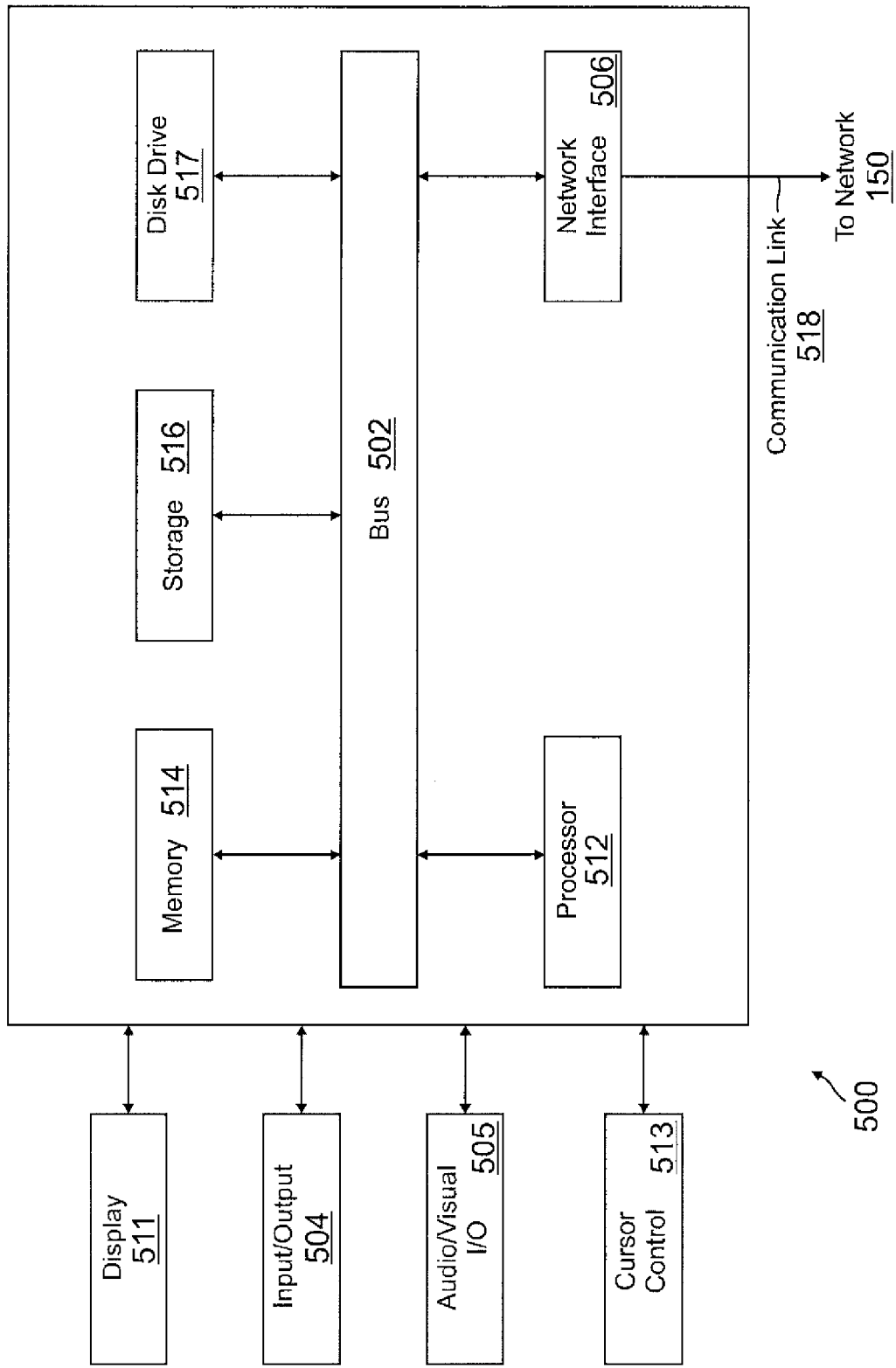
FIG. 5 is a simplified block diagram of a computer system suitable for implementing one or more embodiments of the present disclosure.

FIG. 5 is a block diagram of a computer system 500 suitable for implementing one or more embodiments of the present disclosure. In various embodiments, the endpoint may comprise a personal computing device (e.g., smart phone, a computing tablet, a personal computer, laptop, PDA, Bluetooth device, key FOB, badge, etc.) capable of communicating with the network. The merchant server and/or service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another endpoint, a merchant server, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. A method for distributed transaction processing, the method comprising:
   receiving a distributed transaction comprising a plurality of processes for processing, wherein the processing uses a two-phase commit protocol;
   preparing, by a main coordinator, at least one participating processing node from the plurality of processes, wherein the at least one participating processing node prepares at least a first sub-coordinator in communication with a first participant prepared by the first sub-coordinator and registered only with the first sub-coordinator, wherein the first participant executes a first process of the plurality of processes, wherein the at least one participating processing node further prepares a second sub-coordinator in communication with a second participant registered only with the second sub-coordinator, and wherein the second participant executes a second process of the plurality of processes;
   receiving, by one or more hardware processors of the main coordinator from the at least one participating processing node after preparation of the first sub-coordinator and the second sub-coordinator, a first list comprising first information identifying the first participant registered with the first sub-coordinator and a second list comprising second information identifying the second participant registered with the second sub-coordinator, wherein the at least one participating processing node receives the first information identifying the first participant from the first sub-coordinator and the second information identifying the second participant from the second sub-coordinator, and wherein the main coordinator uses the first list to directly provide a first instruction to the first participant to commit or rollback the first process by the first participant when the first sub-coordinator fails and has not recovered and uses the second list to directly provide a second instruction to the second participant to commit or rollback the second process by the second participant when the second sub-coordinator fails and has not recovered;
   maintaining a transaction log comprising a first state of the first participant and a second state of the second participant, wherein the first state is associated with processing of the first process, and wherein the second state is associated with processing of the second process;
   determining, by the main coordinator, an event of a system failure within the distributed transaction, wherein the system failure comprises at least failure of the first sub-coordinator;
   instructing, by the main coordinator, the first participant to commit or rollback the first process based on committed processes of the plurality of processes and the first state in the transaction log using the first list without the at least one participating processing node;
   generating, by the main coordinator, a heuristic status code for the distributed transaction using at least the instructing, wherein the heuristic status code comprises a completion status of each of the plurality of processes; and
   communicating, by the main coordinator, the heuristic status code to the first participant for use when the first sub-coordinator recovers, wherein the first participant durably records the heuristic status code at least until the first sub-coordinator recovers and retrieves the heuristic status code.

2. The method of claim 1, wherein the second sub-coordinator transmits the second list comprising the second participant registered with the second sub-coordinator to the first sub-coordinator.

3. The method of claim 2, wherein the receiving the first list comprises determining the first list.

4. The method of claim 3, wherein the determining the first list uses at least the second list.

5. The method of claim 1 further comprising:
   contacting, by the main coordinator, the first participant using the first list.

6. The method of claim 5, wherein the main coordinator contacts the first participant in the event of the system failure.

7. The method of claim 5, wherein the main coordinator contacts the first participant if the first sub-coordinator fails.

8. The method of claim 5, wherein the contacting the first participant comprises determining a commit state of the first participant, and wherein the commit state is used in the heuristic status code.

9. A system for distributed transaction processing, the system comprising:
   a main coordinator node that receiving a distributed transaction comprising a plurality of processes for processing, wherein the processing uses a two-phase commit protocol;

at least one participating processing node coupled to the coordinator node, wherein the at least one participating processing node prepares at least a first sub-coordinator in communication with a first participant prepared by the first sub-coordinator and registered only with the first sub-coordinator, wherein the first participant executes a first process of the plurality of processes, wherein the at least one participating processing node further prepares a second sub-coordinator in communication with a second participant registered only with the second sub-coordinator, wherein the second participant executes a second process of the plurality of processes, wherein the at least one participating processing node transmits a first list comprising first information identifying the first participant registered with the first sub-coordinator and a second list comprising second information identifying the second participant registered with the second sub-coordinator to the main coordinator node after preparation of the first sub-coordinator and the second sub-coordinator, wherein the at least one participating processing node receives the first information identifying the first participant from the first sub-coordinator and the second information identifying the second participant from the second sub-coordinator, and wherein the main coordinator uses the first list to directly provide a first instruction to the first participant to commit or rollback the first process by the first participant when the first sub-coordinator fails and has not recovered and uses the second list to directly provide a second instruction to the second participant to commit or rollback the second process by the second participant when the second sub-coordinator fails and has not recovered;

wherein the main coordinator node further maintains a transaction log comprising a first state of the first participant and a second state of the second participant, wherein the first state is associated with processing of the first process, and wherein the second state is associated with processing of the second process, determines an event of a system failure within the distributed transaction, wherein the system failure comprises at least failure of the first sub-coordinator, instructs the first participant to commit or rollback the first process based on committed processes of the plurality of processes and the first state in the transaction log using the first list without the at least one participating processing node, generates a heuristic status code for the distributed transaction using at least the instructing, wherein the heuristic status code comprises a completion status of each of the plurality of processes, and communicates the heuristic status code to the first participant for use when the first sub-coordinator recovers, wherein the first participant durably records the heuristic status code at least until the first sub-coordinator recovers and retrieves the heuristic status code.

10. The system of claim 9, wherein the second sub-coordinator transmits the second list comprising the second participant registered with the second sub-coordinator to the first sub-coordinator.

11. The system of claim 9, wherein the main coordinator node contacts the first participant using the first list.

12. The system of claim 11, wherein the main coordinator node contacts the first participant in the event of the system failure.

13. The system of claim 11, wherein the main coordinator node contacts the first participant if the first sub-coordinator fails.

14. The system of claim 11, wherein the main coordinator contacts the first participant to determine a commit state of the first participant, and wherein the commit state is used in the heuristic status code.

15. A non-transitory computer readable medium comprising a plurality of machine-readable instructions which when executed by one or more processors of a server are adapted to cause the server to perform a method comprising:

receiving a distributed transaction comprising a plurality of processes for processing, wherein the processing uses a two-phase commit protocol;

preparing, by a main coordinator, at least one participating processing node from the plurality of processes, wherein the at least one participating processing node prepares at least a first sub-coordinator in communication with a first participant prepared by the first sub-coordinator and registered only with the first sub-coordinator, wherein the first participant executes a first process of the plurality of processes, wherein the at least one participating processing node further prepares a second sub-coordinator in communication with a second participant registered only with the second sub-coordinator, and wherein the second participant executes a second process of the plurality of processes;

receiving, by the main coordinator from the at least one participating processing node after preparation of the first sub-coordinator and the second sub-coordinator, a first list comprising first information identifying the first participant registered with the first sub-coordinator and a second list comprising second information identifying the second participant registered with the second sub-coordinator, wherein the at least one participating processing node receives the first information identifying the first participant from the first sub-coordinator and the second information identifying the second participant from the second sub-coordinator, and wherein the main coordinator uses the first list to directly provide a first instruction to the first participant to commit or rollback the first process by the first participant when the first sub-coordinator fails and has not recovered and uses the second list to directly provide a second instruction to the second participant to commit or rollback the second process by the second participant when the second sub-coordinator fails and has not recovered;

maintaining a transaction log comprising a first state of the first participant and a second state of the second participant, wherein the first state is associated with processing of the first process, and wherein the second state is associated with processing of the second process;

determining, by the main coordinator, an event of a system failure within the distributed transaction, wherein the system failure comprises at least failure of the first sub-coordinator;

instructing, by the main coordinator, the first participant to commit or rollback the first process based on committed processes of the plurality of processes and the first state in the transaction log using the first list without the at least one participating processing node;

generating, by the main coordinator, a heuristic status code for the distributed transaction using at least the instructing, wherein the heuristic status code comprises a completion status of each of the plurality of processes; and communicating, by the main coordinator, the heuristic status code to the first participant for use when the first sub-coordinator recovers, wherein the first participant durably records the heuristic status code at least until the first sub-coordinator recovers and retrieves the heuristic status code.

16. The non-transitory computer readable medium of claim 15, wherein the method further comprises:
contacting, by the main coordinator, the first participant using the first list.

* * * * *